United States Patent
Panse

(10) Patent No.: US 11,025,453 B2
(45) Date of Patent: Jun. 1, 2021

(54) OUTSIDE-OF-NETWORK MANAGEMENT OF A COMPONENT IN A VIRTUAL DATA CENTER USING A REMOTE DISPLAY ON A HOST MANAGEMENT SERVER

(71) Applicant: VMware, Inc., Palo Alto, CA (US)

(72) Inventor: Tejas Sanjeev Panse, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 15/934,027

(22) Filed: Mar. 23, 2018

(65) Prior Publication Data

US 2019/0296940 A1 Sep. 26, 2019

(51) Int. Cl.
*H04L 12/46* (2006.01)
*H04L 12/24* (2006.01)
*G06F 9/455* (2018.01)

(52) U.S. Cl.
CPC ...... *H04L 12/4633* (2013.01); *G06F 9/45558* (2013.01); *H04L 41/0803* (2013.01); *G06F 2009/45591* (2013.01); *G06F 2009/45595* (2013.01)

(58) Field of Classification Search
CPC ............. H04L 12/4633; H04L 41/0803; G06F 9/45558; G06F 2009/45591–45595
See application file for complete search history.

(56) References Cited

U.S. PATENT DOCUMENTS

| | | | |
|---|---|---|---|
| 8,230,414 B1 | 7/2012 | Hand et al. | |
| 9,282,072 B1 * | 3/2016 | Tung | H04L 43/0817 |
| 10,404,783 B2 * | 9/2019 | Panse | H04L 41/22 |
| 2004/0255263 A1 | 12/2004 | Ando | |
| 2005/0129035 A1 * | 6/2005 | Saito | H04L 41/50 370/401 |
| 2005/0226641 A1 | 10/2005 | Ando et al. | |
| 2006/0031447 A1 * | 2/2006 | Holt | H04L 41/00 709/223 |
| 2006/0048165 A1 | 3/2006 | Kautzleben et al. | |
| 2006/0116841 A1 | 6/2006 | Baekelmans et al. | |

(Continued)

OTHER PUBLICATIONS

Open HMS—Version 2.0 Beta Excerpts from https://github.com/vmware-archive/OHMS GitHub commit: Mar. 5, 2017 (Year: 2017).*

(Continued)

*Primary Examiner* — Emerson C Puente
*Assistant Examiner* — Paul V Mills

(57) ABSTRACT

Outside-of-network management of a component in a virtual data center using a remote display on a HMS is disclosed. A computing device, outside of the virtual data center network, requests access to a host JNLP file for a host on the component. After receiving the request, the host provides the host JNLP file to the HMS. The HMS initiates a web based application, opens a port for access to the application, and provides the port information to a WebService within the virtual data center network. The WebService opens a port that the computing device can use to access the WebService and provides the webService port information and the HMS port information to the computing device. The computing device uses a browser to remotely manage the component via the port information and the application operating on the HMS.

16 Claims, 11 Drawing Sheets

(56) References Cited

U.S. PATENT DOCUMENTS

| | | |
|---|---|---|
| 2006/0218228 A1 | 9/2006 | Mouline |
| 2006/0259612 A1* | 11/2006 | De Oliveira ........ H04L 41/0226 709/224 |
| 2007/0058657 A1* | 3/2007 | Holt ................... H04L 41/0226 370/438 |
| 2007/0115992 A1* | 5/2007 | Weinstock ............ G06F 3/0227 370/392 |
| 2009/0210702 A1 | 8/2009 | Welingkar et al. |
| 2011/0289192 A1 | 11/2011 | Denise et al. |
| 2012/0072905 A1 | 3/2012 | Traversat et al. |
| 2013/0139234 A1 | 5/2013 | Inbaraj et al. |
| 2013/0326039 A1* | 12/2013 | Shah ..................... G06F 13/128 709/223 |
| 2015/0207904 A1* | 7/2015 | Siegman ............ H04N 21/2343 709/217 |
| 2016/0275037 A1* | 9/2016 | Dube ................. G06F 13/4282 |
| 2017/0149569 A1 | 5/2017 | Prabhu et al. |
| 2017/0270317 A1 | 9/2017 | Spaulding et al. |
| 2018/0026854 A1* | 1/2018 | Bhatia ................... G06F 16/13 715/735 |
| 2018/0315004 A1 | 11/2018 | Lecourtier et al. |
| 2019/0088233 A1* | 3/2019 | Chew ..................... G06F 21/82 |

OTHER PUBLICATIONS

VMware Cloud Foundation Digging Deeper into the Architecture Ray Heffer (Year: 2016).*
"IPMI Proxy" WebHostingTalk.com forum post user handle: "dukemaster" (Year: 2017).*
Bioinformatics Applications in the Virtual Laboratory Tomasz Jadczyk Chapters 4, 9, and 10 (Year: 2009).*
VMware EVO SDDC Overview and Bring-Up Guide VMware, EN-001781-01 Published no later than Nov. 4, 2016 (Year: 2016).*
BladeCenter chassis management T. Brey, B. E. Bigelow, J. E. Bolan, H. Cheselka, Z. Dayar, J. M. Franke, D. E. Johnson, R. N. Kantesaria et al. (Year: 2005).*
Intel® Virtual Gateway—Take Control of Your Data Center Intel Corporation (Year: 2013).*
Out-of-Band Network Management Felix Emmert (Year: 2015).*
Unleashing the Power of iLO, IPMI and Other Service Processors Emerson Network Power 0710-SP-WP-EN (Year: 2010).*
Google search "jnlp file" result, printed 2019, 2019.
Google search "jnlp tunnel" result, printed 2019, 2019.

* cited by examiner

600

```
┌─────────────────────────────────────────────────────────────┐
│ PROVIDING, FROM A COMPUTING DEVICE OUTSIDE OF A VIRTUAL DATA CENTER │
│ NETWORK, A REQUEST FOR ACCESS TO A HOST JAVA NETWORK LAUNCH │
│ PROTOCOL (JNLP) FILE FOR A HOST ON THE COMPONENT IN THE VIRTUAL │
│ DATA CENTER NETWORK. 610 │
└─────────────────────────────────────────────────────────────┘
                              │
                              ▼
┌─────────────────────────────────────────────────────────────┐
│ RESPONSIVE TO RECEIVING THE REQUEST FOR ACCESS TO THE HOST JNLP │
│ FILE AT THE HOST, PROVIDING THE HOST JNLP FILE TO A HMS IN THE │
│ VIRTUAL DATA CENTER NETWORK. 615 │
└─────────────────────────────────────────────────────────────┘
                              │
                              ▼
┌─────────────────────────────────────────────────────────────┐
│ RESPONSIVE TO RECEIVING THE HOST JNLP FILE AT THE HMS, INITIATING A │
│ REMOTE DISPLAY SERVER ON THE HMS. 617 │
└─────────────────────────────────────────────────────────────┘
                              │
                              ▼
┌─────────────────────────────────────────────────────────────┐
│ PROVIDING, FROM THE HMS AND TO A WEBSERVICE INSIDE THE VIRTUAL │
│ DATA CENTER NETWORK, AN HMS PORT INFORMATION. 620 │
└─────────────────────────────────────────────────────────────┘
                              │
                              ▼
┌─────────────────────────────────────────────────────────────┐
│ PROVIDING, FROM THE WEBSERVICE AND TO THE COMPUTING DEVICE │
│ OUTSIDE OF THE VIRTUAL DATA CENTER NETWORK, A WEBSERVICE PORT │
│ INFORMATION, THE WEBSERVICE PORT INFORMATION INCLUDING THE HMS │
│ PORT INFORMATION . 625 │
└─────────────────────────────────────────────────────────────┘
                              │
                              ▼
┌─────────────────────────────────────────────────────────────┐
│ RESPONSIVE TO RECEIVING THE WEBSERVICE PORT INFORMATION AT THE │
│ COMPUTING DEVICE OUTSIDE OF THE VIRTUAL DATA CENTER NETWORK, │
│ UTILIZING THE WEBSERVICE PORT INFORMATION TO ESTABLISH A │
│ CONNECTION FROM A BROWSER ON THE COMPUTING DEVICE OUTSIDE OF THE │
│ VIRTUAL DATA CENTER NETWORK TO THE HMS IN THE VIRTUAL DATA CENTER │
│ NETWORK . 630 │
└─────────────────────────────────────────────────────────────┘
                              │
                              ▼
┌─────────────────────────────────────────────────────────────┐
│ UTILIZING THE BROWSER ON THE COMPUTING DEVICE AND THE CONNECTION │
│ TO THE HMS TO PROVIDE REMOTE MANAGEMENT OF THE COMPONENT VIA THE │
│ REMOTE DISPLAY SERVER OPERATING ON THE HMS. 635 │
└─────────────────────────────────────────────────────────────┘
```

FIG. 6

OUTSIDE-OF-NETWORK MANAGEMENT OF A COMPONENT IN A VIRTUAL DATA CENTER USING A REMOTE DISPLAY ON A HOST MANAGEMENT SERVER

BACKGROUND

Virtual-machine technology essentially abstracts the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Within virtual servers as well as physical servers, virtual machines and virtual applications can be moved among multiple virtual or physical processors in order to facilitate load balancing and to co-locate compatible virtual machines and virtual applications with respect to virtual and physical processors. Similarly, virtual machines and virtual applications can be moved among the virtual servers in a virtual data center as well as among physical servers in the underlying physical hardware in which virtual data centers are constructed. Migration of virtual machines and virtual applications in virtual data centers can also be used for load balancing, fault tolerance and high availability, and for many other purposes.

However, managing the virtual servers as well as physical servers, virtual machines and virtual applications often requires on site access which can be expensive and inconvenient depending upon the location of the remote site.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 6 illustrates a flow diagram of another method for outside-of-network management of a component in a virtual data center, according to various embodiments.

DESCRIPTION OF EMBODIMENTS

Figure 1:
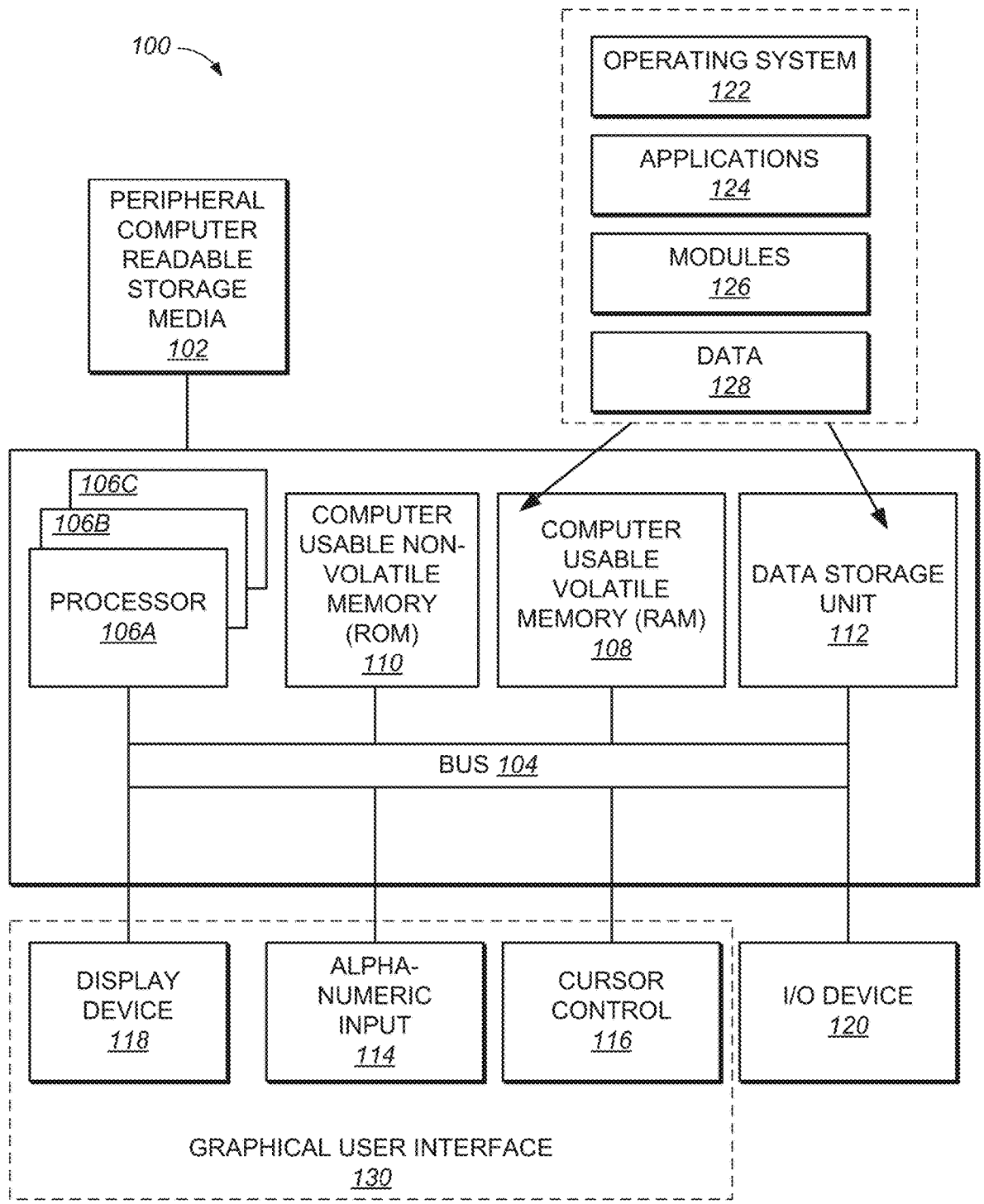
FIG. 1 illustrates an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device (e.g., ClientMachine) or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. An example cloud-based computing environment, upon which embodiments of the present invention may be implemented, is then discussed. An example UI is then described. The management UI on the computing system outside of the virtual network, utilizes the present technology to manage components within a software-defined data center (SDDC) remotely, in accordance with various embodiments, are then described.

SDDC is a hyper-converged infrastructure (HCI) solution based on defined hardware configurations pre-integrated with a software-defined data center (SDDC) software. The EVO SDDC solution enables customers to deploy a fully self-contained Infrastructure-as-a-Service (IaaS) and/or Virtual Desktop Infrastructure (VDI) private cloud based on a complete SDDC architecture.

JNLP stands for Java network launch protocol which enables an application to be launched on the client desktop by using resources hosted on a remote web server. In general, a JNLP file includes a set of rules defining the implementation of the launching mechanism. As such, JNLP files will include information about the location of a jar package file, a name of the main class for the application, and any other parameters for the program. Opening the JNLP file opens a java web start application which talks to the host to enable and display the video feed, and take in the client keyboard and mouse as the input. In the background, opening the JNLP file downloads the required jars and starts the application. The application then talks to the port enabled on the host for this communication.

JAR (Java Archive) is a file format used to aggregate class files, metadata, and resources into a single file for distribution.

Outside-of-network computing system refers to a computing system that is not within the Virtual network that it wants to monitor. The computing system is not a part of the assigned network and would not otherwise have access to the management aspects within the virtual network.

Tunneling models include open system interconnections (OSI), transmission control protocol and the Internet protocol (TCP/IP) and the like. In general, tunneling allows a network user to access a network service indirectly. For example, a tunneling protocol may be used to allow an unsupported protocol to run over a network.

The present technology provides a management solution to a problem that presently exists when an outside-of-network computing system wants to control the host, which is configured to not be controlled remotely. Using the tunnels and the Jars then the tunnels discussed herein will allow the outside-of-network computing system to interact with the host. That is, an out of network machine can control the host remotely such that when you open the JNLP file there is a list of what jobs can be performed/are available by the virtual machine.

For example, management of a virtual network can include monitoring and awareness of the health, capacity, performance, and environment. Example virtual network health information includes, data health, infrastructure health, network health, and input/output operations per second (IOPS). Example capacity information includes data efficiency, data distribution, and usage predictions. Example performance information includes IOPS, throughput, latency and latency hotspots. Example environment information includes VM overview, host overview, version usage, enabled features, and the like.

In one embodiment, the management by the outside-of-network computing system is performed by allowing each component in the chain between the outside-of-network computing system and the host to modify a JNLP file received from the host. At each component in the chain the content of the JNLP file is edited at the IP address (e.g., modified IP) to indicate an open tunnel between each component in the chain.

Since, at the application level it is known which call is coming for each type of port. For example, 5900 is a video port. The JNLP file is parameterized and then passes through the port. In the present discussion, parameterized means that the port needs to be changed. The ports open as TCP tunnels between the components as defined by the JNLP parameters.

Thus, the edited JNLP content, when utilized by the outside-of-network computer system, allows the nearest tunnel and nearest port to be available to the outside-of-network computer system at each link until the host is reached.

Importantly, the embodiments of the present invention, as will be described below, provide an approach for managing a virtual data center from a machine outside of the network which differs significantly from the conventional processes used in UI communication. In conventional approaches, if the host out-of-band (OOB) is not accessible outside the datacenter, the admin might have to physically connect with the host, open the BMC console and start the service, or have a virtual machine (or a jump vm) running on the same network in order to reach the BMC console. Such conventional approaches are tedious, time-consuming, and often result in increased IT costs due to physical travel required by the IT personnel.

Instead, the present embodiments, as will be described and explained below in detail, provide a previously unknown procedure for managing a virtual data center from a machine outside of the network. With evolving technology, aiming at reducing IT costs, it makes sense for applications managing a Hyper Converged Infrastructure to view host consoles via remote console.

For such applications, the software component interacting directly with the hardware might run in an isolated network for security or architectural reasons, different from the network where the web service is hosted. As such, there needs to be a straight forward way to make the remote console of the underlying hosts accessible to the clients via the web service hosted for ease of management, and reduction of costs.

As will be described in detail, the various embodiments of the present invention do not merely implement conventional remote management processes on a computer. Instead, the various embodiments of the present invention, in part, provide a previously unknown procedure for providing outside-of-network management of a component in a virtual data center. Hence, embodiments of the present invention provide a novel process for outside-of-network management of a component in a virtual data center which is necessarily rooted in computer technology to overcome a problem specifically arising in the realm of hyper converged infrastructures and distributed systems.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or in a number of different computer systems including, but not limited to, general purpose networked computer systems, embedded computer systems, routers, switches, server devices, client devices, various intermediate devices/nodes, stand-alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C.

System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations in RAM 108, computer-readable storage media in data storage unit 112, peripheral computer-readable storage media 102, and/or other tangible computer-readable storage media.

Example Computing Environment

Figure 2A:
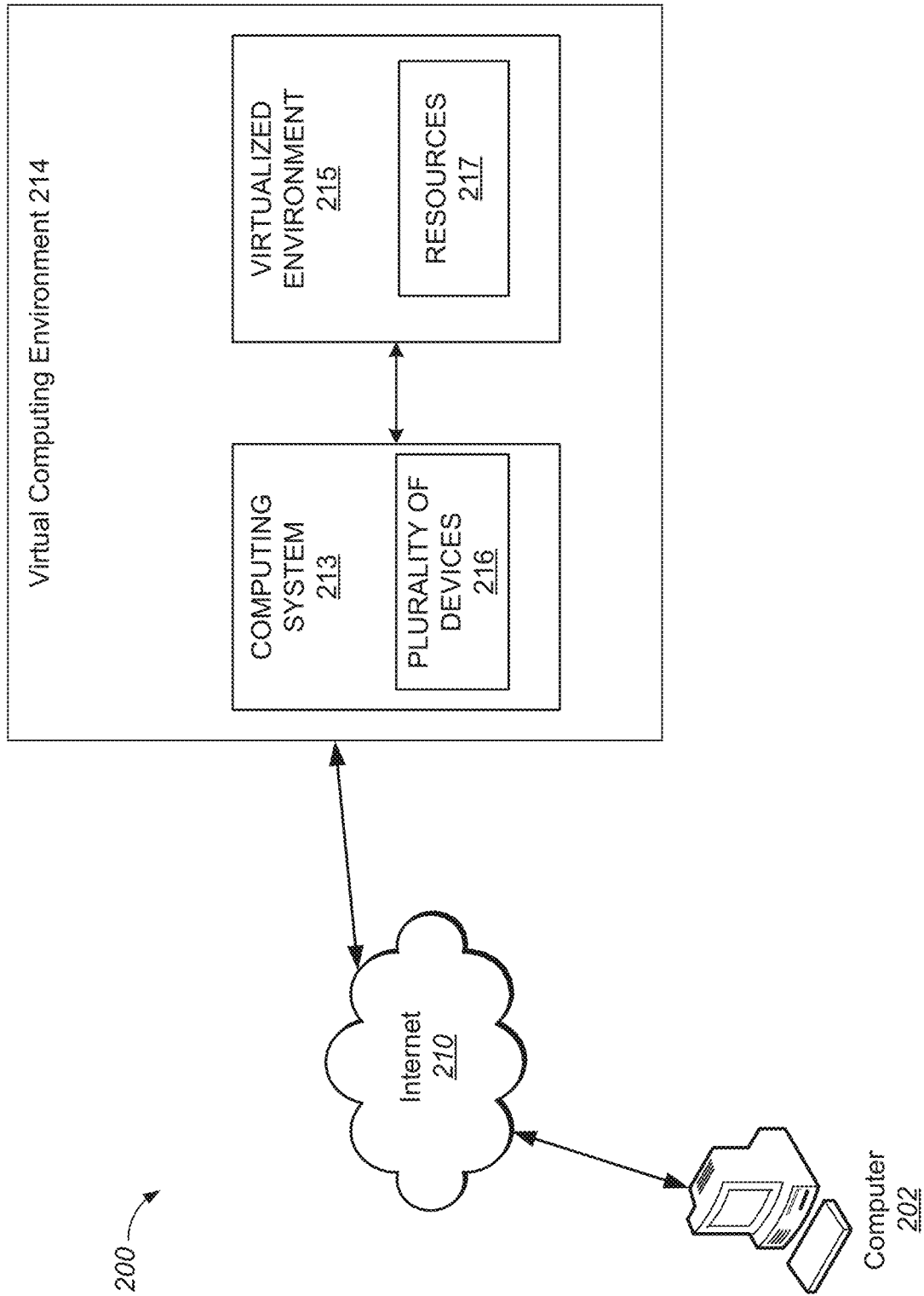
FIG. 2A illustrates an example cloud-based computing environment communicatively coupled with an out-of-network computer system upon which embodiments described herein may be implemented.

FIG. 2A illustrates an example virtual computing environment communicatively coupled with an out-of-network computing device 202 upon which embodiments described herein may be implemented. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 2A, a system administrator for an organization, using out-of-network computing device 202, accesses the virtual computing environment (VCE 214), through a connection such as, but not limited to, the Internet 210.

For example, the administrator can, using out-of-network computing device 202, configure virtual computer systems and even entire virtual data centers and launch execution of application programs on the virtual computer systems and virtual data centers in order to carry out any of many different types of computational tasks.

In one embodiment, VCE 214 (or virtualization infrastructure) includes computing system 213 and virtualized environment 215, according to various embodiments. In general, computing system 213 and virtualized environment 215 are communicatively coupled over a network such that computing system 213 may access functionality of virtualized environment 215.

In one embodiment, computing system 213 may be a system (e.g., enterprise system) or network that includes a combination of computer hardware and software. The corporation or enterprise utilizes the combination of hardware and software to organize and run its operations. To do this, computing system 213 uses resources 217 because computing system 213 typically does not have dedicated resources that can be given to the virtualized environment 215. For example, an enterprise system (of the computing system 213) may provide various computing resources for various needs such as, but not limited to information technology (IT), security, email, etc.

In various embodiments, computing system 213 includes a plurality of devices 216. The devices are any number of physical and/or virtual machines. For example, in one embodiment, computing system 213 is a corporate computing environment that includes tens of thousands of physical and/or virtual machines. It is understood that a virtual machine is implemented in virtualized environment 215 that includes one or some combination of physical computing machines. Virtualized environment 215 provides resources 217, such as storage, memory, servers, CPUs, network switches, etc., that are the underlying hardware infrastructure for VCE 214.

The physical and/or virtual machines of the computing system 213 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 213 may be a cloud environment, built upon a virtualized environment 215. Computing system 213 may be located in an Internet connected datacenter or a private cloud computing center coupled with one or more public and/or private networks. Computing system 213, in one embodiment, typically couples with a virtual or physical entity in a computing environment through a network connection which may be a public network connection, private network connection, or some combination thereof. For example, a user may connect, via an Internet connection, with computing system 213 by accessing a web page or application presented by computing system 213 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware Exit hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a virtual system are provided with respect to FIG. 2B.

During use, the virtual machines perform various workloads. For example, the virtual machines perform the workloads based on executing various applications. The virtual machines can perform various workloads separately and/or in combination with one another.

Example VMware EVO SDDC Rack

Figure 2B:
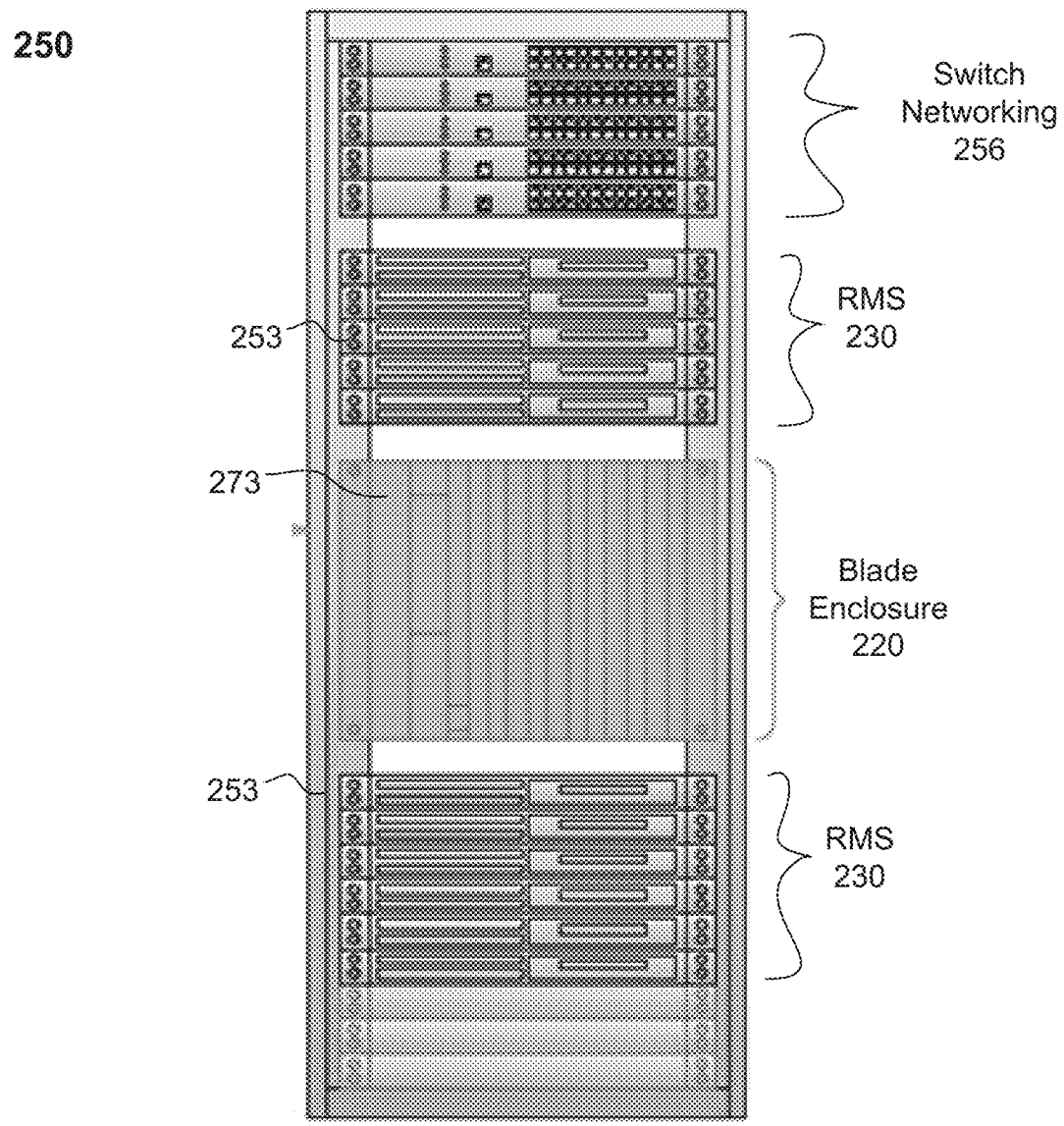
FIG. 2B, illustrates a block diagram of a VMware EVO SDDC rack upon which embodiments described herein may be implemented.

With reference now to FIG. 2B, a block diagram of a VMware EVO SDDC rack 250 (hereinafter SDDC rack 250) is shown in accordance with an embodiment. In one embodiment, SDDC rack 250 is a combination of software and hardware that are stored on a rack. However, the technology is also suited to one or more components of SDDC rack 250 being stored in locations other than the rack. Moreover, although there are some specific organizations of SDDC rack 250 discussed herein and contained in the figures, the technology may be well suited to different arrangements, organization, or the like. In general, SDDC rack 250 utilizes the concepts of virtualization across all data center resources and services (compute, storage, and networking) to deliver a fully automated, zero-downtime infrastructure that can transparently include different hardware over time. SDDC rack 250 provides abstraction, pooling, and automation of the compute/storage/networking infrastructure services. Under SDDC rack 250, policy-driven automation will enable provisioning and ongoing management of both physical and logical compute, storage, and network services. In FIG. 2B, SDDC rack 250 includes switch networking 256, blade enclosure 220, and rack server or rackmount servers (RMS) 230.

Switching networking 256 may also include management capabilities that are part of a dedicated management infrastructure running in each physical rack. The management capabilities include aspects such as inventory management, security management, performance management, and availability management.

Inventory management refers to aspects such as a virtual resource manager (VRM), and the like. VRM is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, the VRM will automatically discover new devices and processes hardware events (e.g., alarms, sensor data threshold triggers) and state changes. VRM then exposes events and state changes to the rest of the SDDC rack in a hardware-independent manner. VRM also supports rack-level boot-up sequencing of hardware components and provides services such as secure, remote, hard reset of these components.

In general, VRM manages the physical components of the physical rack, e.g., blade server(s) 273 in blade enclosure 220, servers in RMS 230, and the like; and maintains a corresponding software physical rack object. In other words, VRM monitors the hardware health of the switches and hosts and reports each one's health status. Thus, the VMware EVO SDDC system calculates the hardware health state of the resource based on the current set of alerts that the VRM has raised for that hardware resource and the severities of those alerts, including any alerts on the hardware Field Replaceable Units (FRUs) contained within that resource.

In one embodiment, security management manages remoted disks and access to one or more resources in rack 250. Security management may manage access using secure industry authentication schemes.

In one embodiment, performance management matches application performance needs with available infrastructure. Availability management matches application availability requirements for the given application.

Switch networking 256 includes one or more different switch and network devices that allow rack 250 to communicate with different racks, different switches, switches from different manufacturers, racks with different operating systems, and the like. A switch in switch networking 256 may be any of a number of switch types, such as, for example, a management switch, a top of rack (TOR) switch, spine switch, or the like.

Blade enclosure 220 is an enclosure to host one or more blade server(s) 273. Similarly, RMS 230 refers to one or more rack server(s) 253 stored in rack 250. In general, server 253 may be any of a plurality of server types. One example of a server's characteristics may be an Intel x86 based server that contains redundant, multi-gigabit network interfaces, power supplies, as well as a combination of hard drives and solid state drives. Although in FIG. 2B, a specific number of servers, blades, and switches are shown, it should be appreciated that one embodiment of a full rack may include 24 nodes which may be include a number of servers, a number of blades, a number of switches, a number of other components, and the like. Thus, the use of arrangement provided in the diagram and used in the discussion is merely for purposes of clarity.

Example User Interface for Managing the Virtual Data Center from the Out-of-Network Computer System FIGS. 3A-3D illustrate a number of different views during an example workflow of the graphical user interface (UI) 300 for managing a component within the virtual data center, in accordance with various embodiments.

Figure 3A:
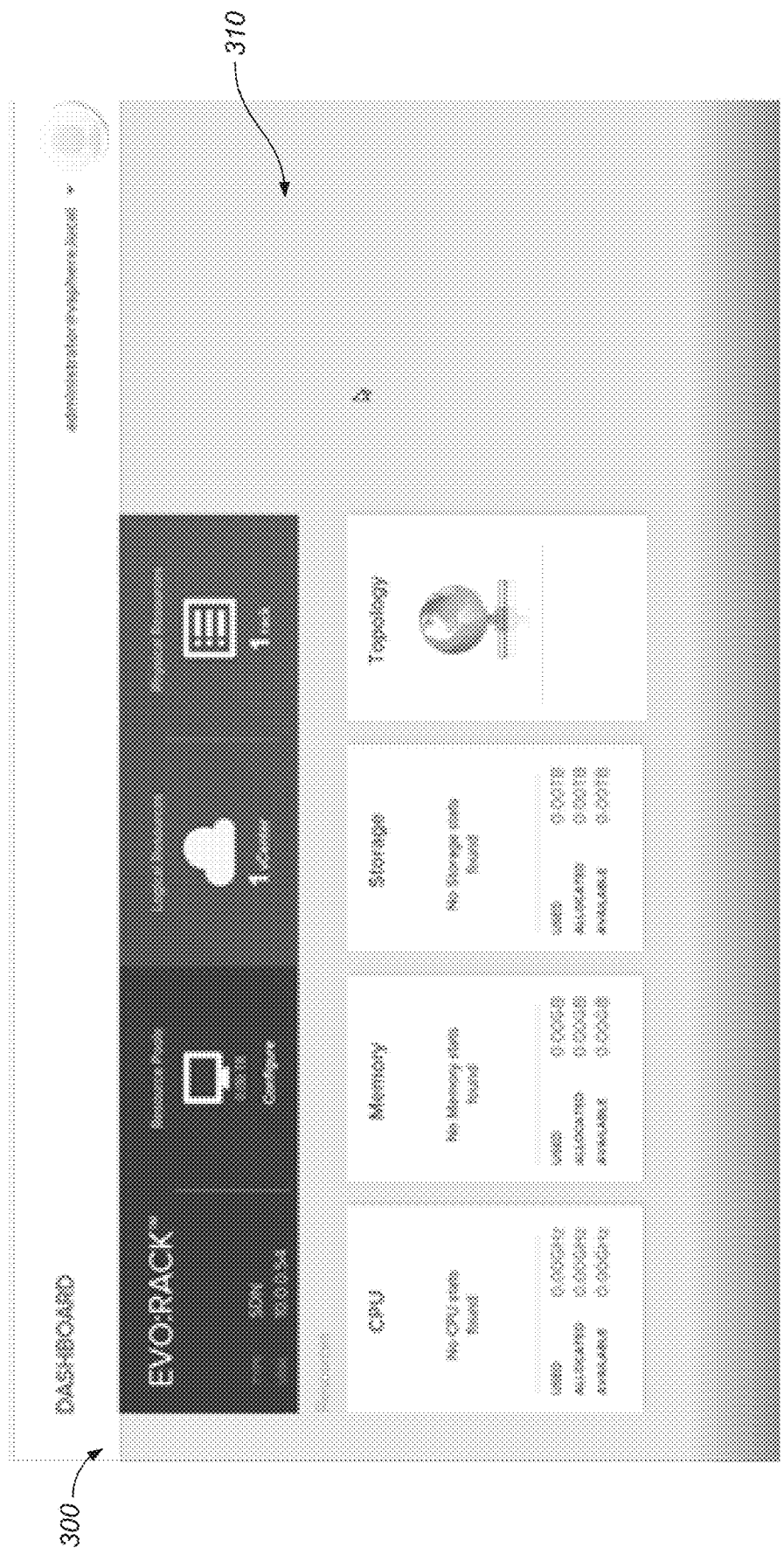
FIG. 3A illustrates a view of an example workflow of the graphical user interface for managing the virtual data center with the out-of-network computing device, in accordance with various embodiments.

FIG. 3A illustrates a view of an example workflow of the UI 300 for managing the virtual data center with the out-of-network computing device (e.g., ClientMachine), in accordance with various embodiments. At view 310, UI 300 illustrates an initial selection of the rack which the user is going to manage from the outside-of-network computing system.

Figure 3B:
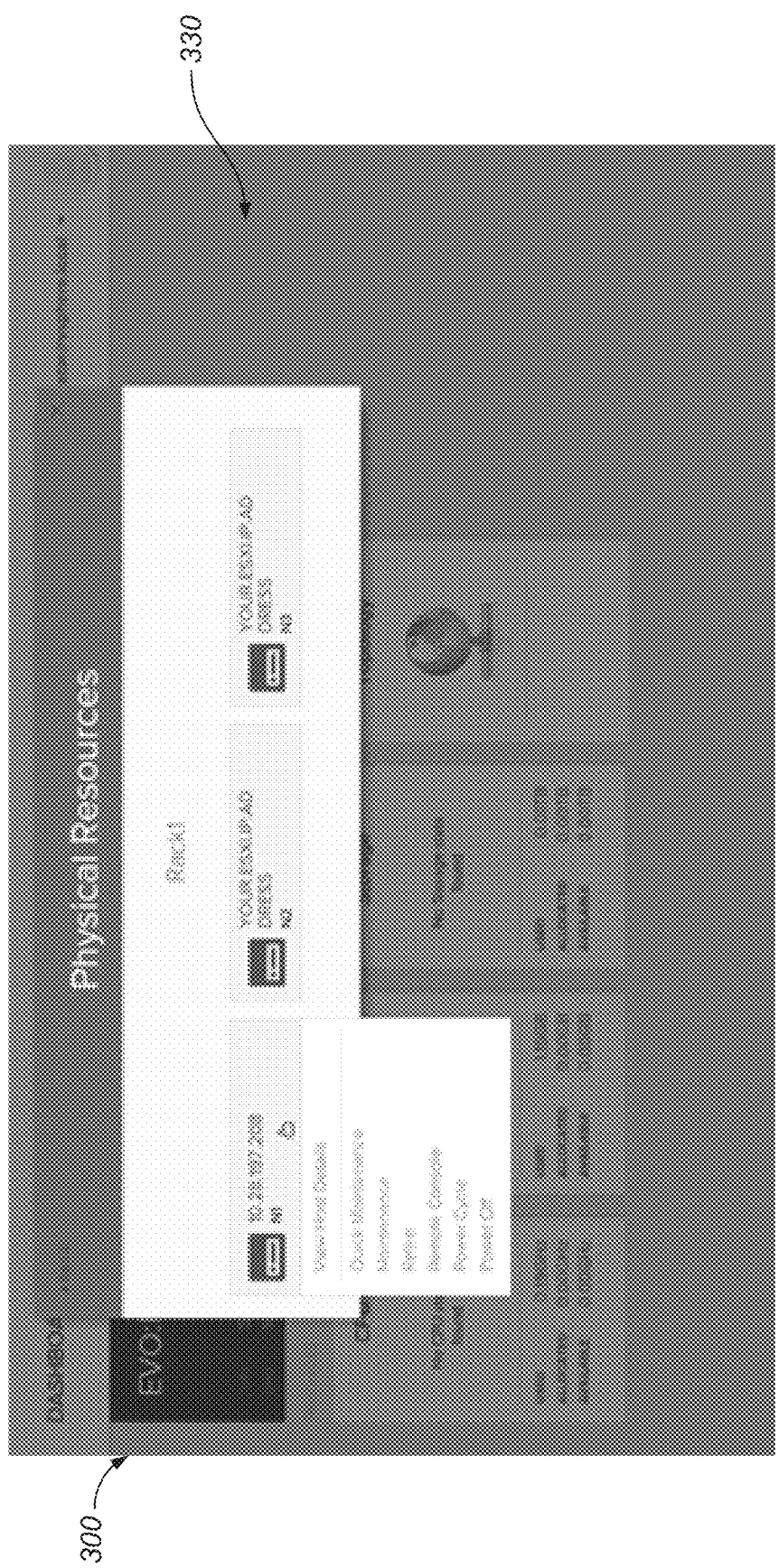
FIG. 3B illustrates a view of an example workflow of the graphical user interface showing a physical resources list of the rack in the virtual network on the out-of-network computing device, in accordance with various embodiments.

FIG. 3B illustrates a view of an example workflow of UI 300 showing a physical resources list of the rack in the virtual network on the out-of-network computing device, in accordance with various embodiments. At view 330, UI 300 illustrates drop down menu offering a number of management choices about the rack which the user can use to manage the rack from the outside-of-network computing system. One choice is the option to open the remote console. Although a number of choices are shown in the drop down menu, it should be appreciated that there may be more or fewer drop down choices and those choices may be rack specific, factory established, user selected, or the like.

Figure 3C:
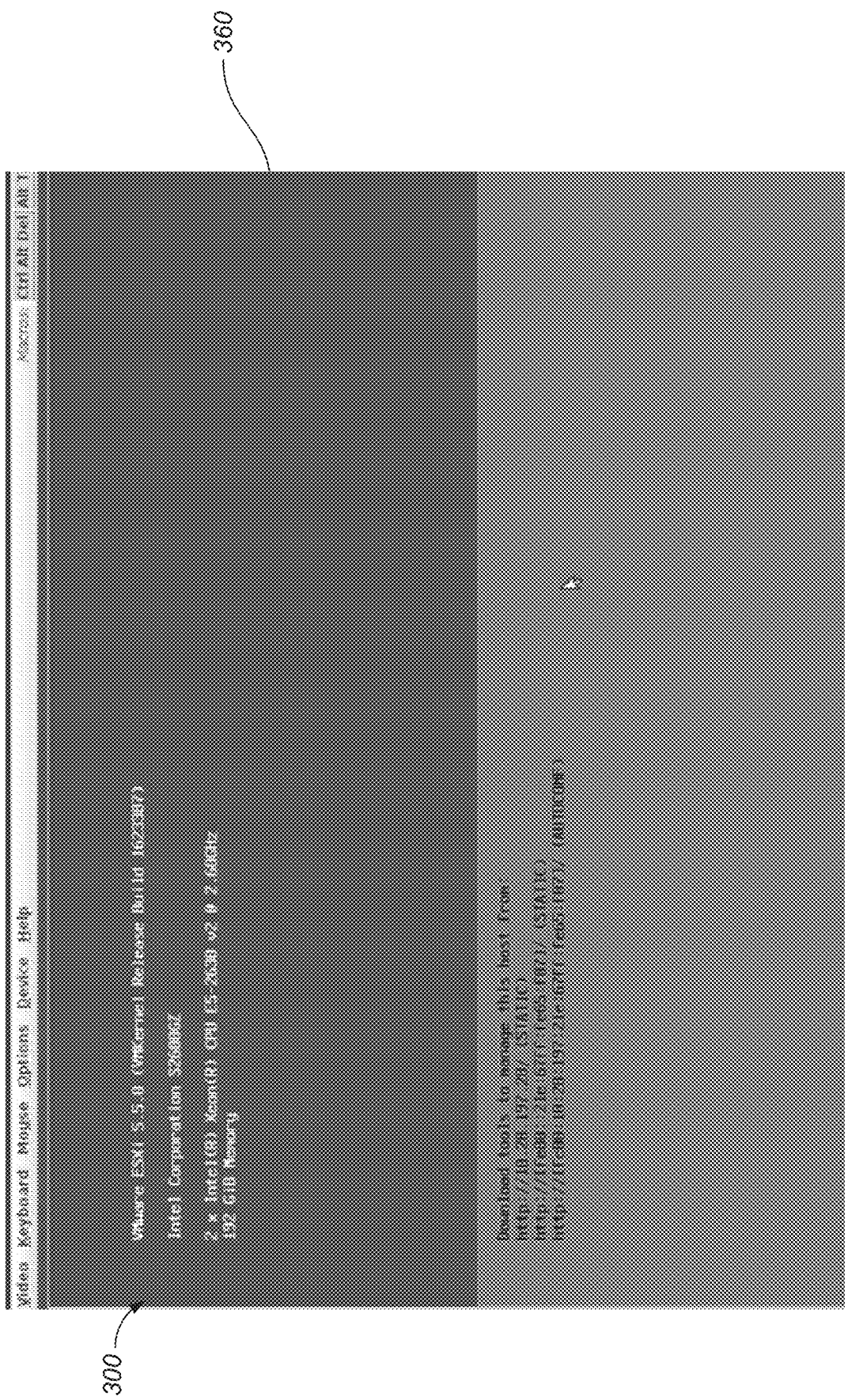
FIG. 3C illustrates a view of an example workflow of the graphical user interface showing a request being established for the JNLP file on the out-of-network computing device, in accordance with various embodiments.

FIG. 3C illustrates a view of an example workflow of UI 300 showing a request being established for the JNLP file on the out-of-network computing device, in accordance with various embodiments. At view 360, UI 300 illustrates a portion of the JNLP file that will be used to navigate the tunnels between the outside-of-network computing system and the host. Although a number of lines are shown in the JNLP file, it should be appreciated that there may be more or fewer lines depending upon the number of tunnels that exist between the outside-of-network computing system and the host.

Figure 3D:
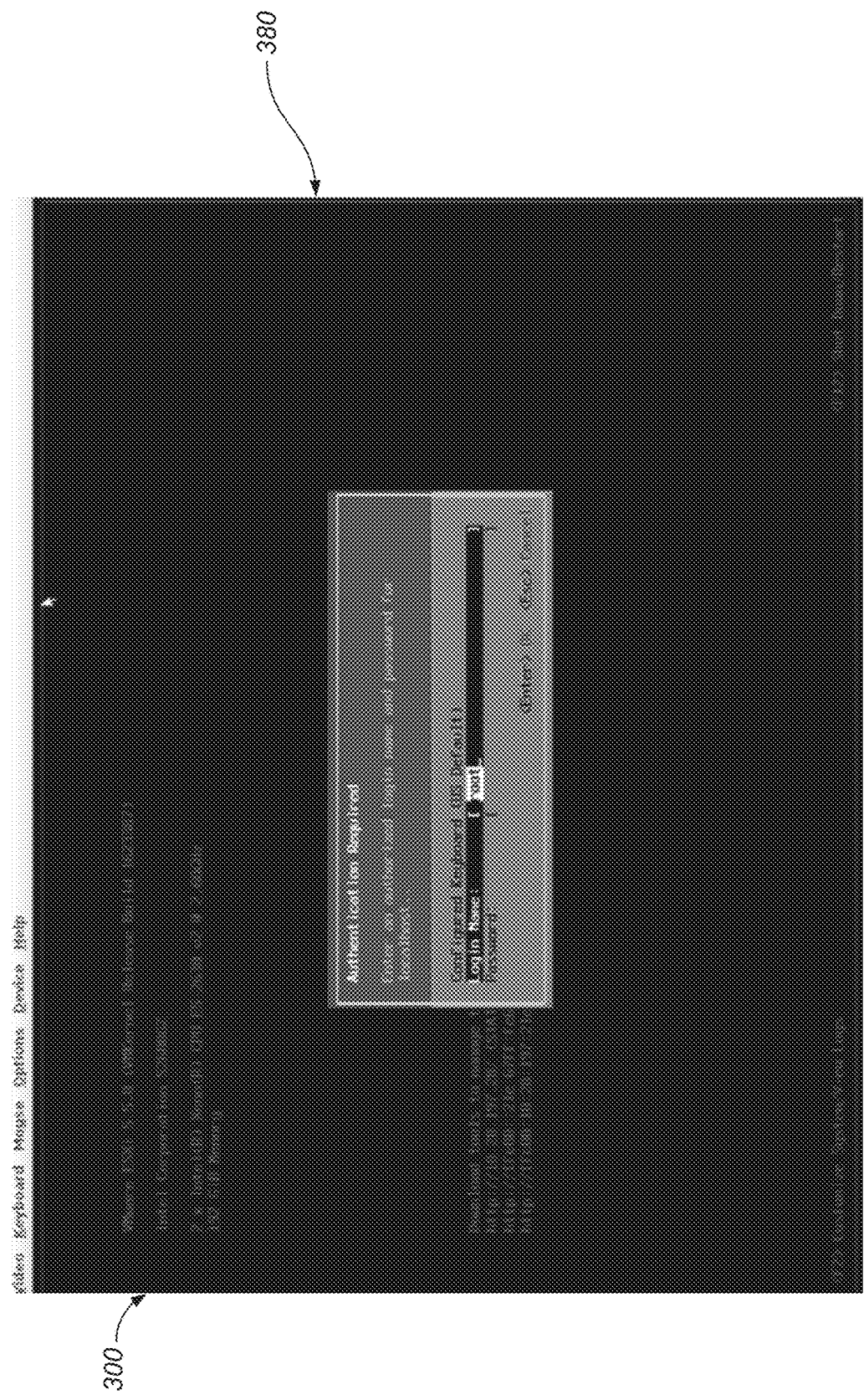
FIG. 3D illustrates a view of an example workflow of the graphical user interface showing a password being provided on the out-of-network computing device, in accordance with various embodiments.

FIG. 3D illustrates a view of an example workflow of UI 300 showing a view 380 of a password being provided on the out-of-network computing device, in accordance with various embodiments. As described herein, the edited JNLP content, when utilized by the outside-of-network computer system, allows the nearest tunnel and nearest port to be available to the outside-of-network computer system at each link until the host is reached. At the same time, the JNLP file will maintain the appropriate user names and passwords for each link in the chain such that the host will interact with the computing system as though it is an authorized member of the virtual network.

It should be appreciated that UIs may be designed to provide a particular interactive experience based on the type of information presented and/or received through the UI. Moreover, a UI may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a UI are typically design decisions, where a UI designer might attempt to provide particular elements to present and/or receive particular types of information. For example, a simple UI may include a drop-down list, where a user would select an item from the drop down list.

Example Methods of Operation

Figure 4:
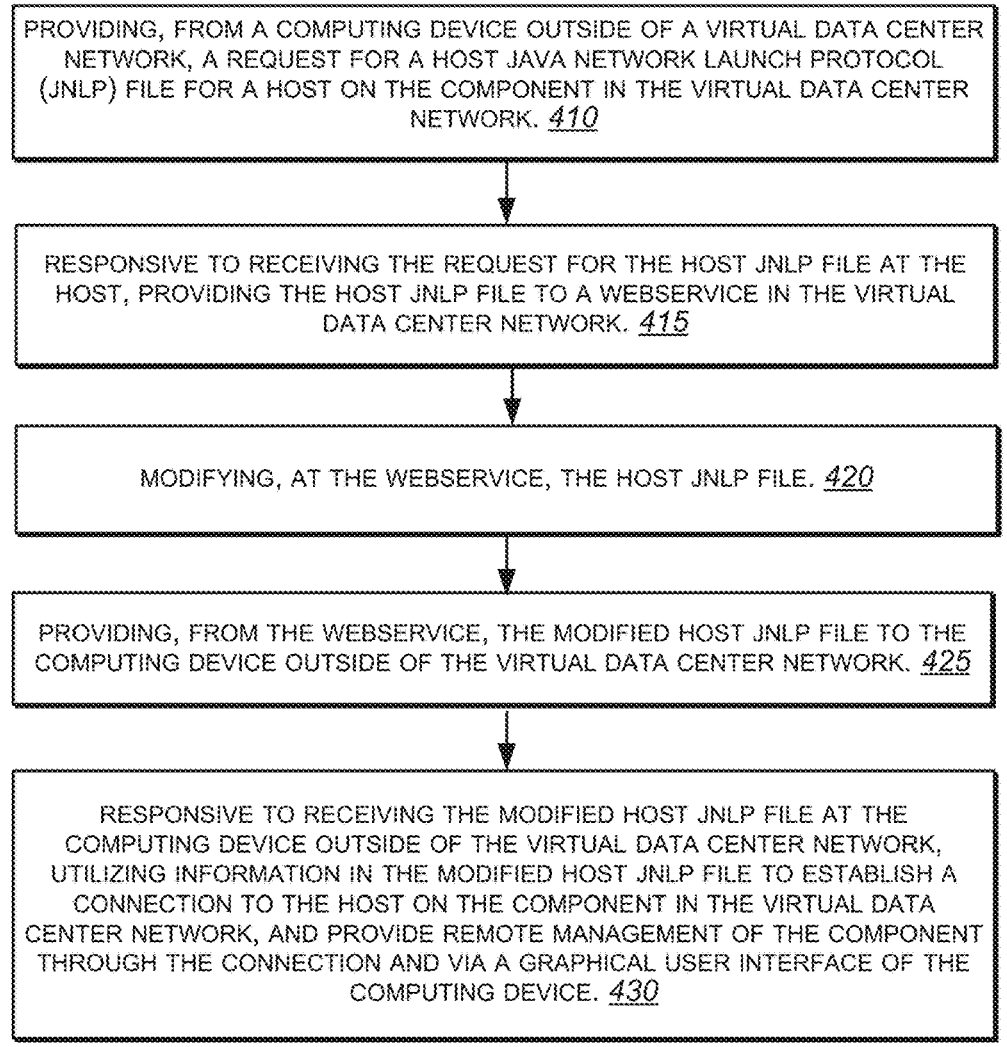
FIG. 4 illustrates a flow diagram of a method for outside-of-network management of a component in a virtual data center, according to various embodiments.

FIG. 4 illustrates a flow diagram 400 of another method for providing outside-of-network management of a component in a virtual data center, according to various embodiments. Procedures of the method will be described with reference to elements and/or components of FIGS. 2 and 5. It is appreciated that in some embodiments, the procedures may be performed in a different order than described, that some of the described procedures may not be performed, and/or that one or more additional procedures to those described may be performed. Flow diagram 400 includes some procedures that, in various embodiments, are carried out by one or more processors under the control of computer-readable and computer-executable instructions that are stored on non-transitory computer-readable storage media. It is further appreciated that one or more procedures described in flow diagram 400 may be implemented in hardware, software, or a combination of hardware with firmware and/or software.

Figure 5:
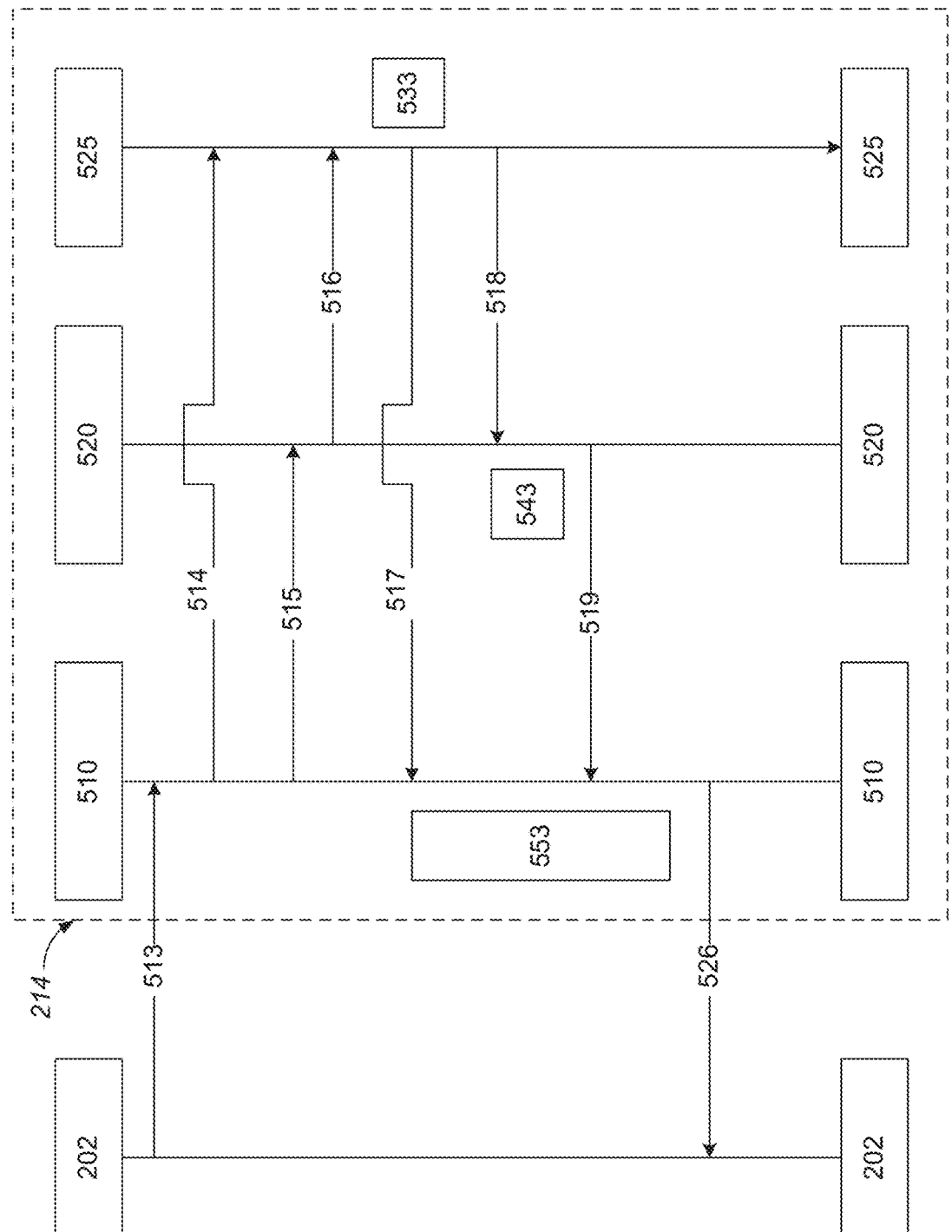
FIG. 5 illustrates a block diagram illustrating the outside-of-network management connection and in network connections for communication between the computer system and the component of the virtual data center, according to various embodiments.

With reference to FIG. 5, a block diagram of the establishment of another outside-of-network management connection for communication between the computing device 202 and the component of the virtual data center is shown in accordance with an embodiment. In one embodiment, for purposes of the discussion, the computing device 202 which is outside of the VCE 214 can reach the WebService 510 and the WebService 510 can reach the Host 525. In another embodiment, also discussed herein, the computing device 202 which is outside of the VCE 214 can reach the WebService 510, the WebService 510 can reach the HMS 520, and only HMS 520 is allowed to talk to Host 525. However, it should be appreciated that there may be other connections, including more or less connections, that may be placed between the computing device 202 and the host 525. The following discussion is just one version that can readily be expanded or contracted within the scope of the discussion.

With reference to 410 of flow diagram 400 and to FIG. 5, one embodiment provides, from a computing device 202 outside of a VCE 214, a request 513 for a host java network launch protocol (JNLP) file 533 for a host 525 on the component in the VCE 214.

An example of a host JNLP file 533 would be similar to:

```
<?xml version="1.0" encoding="UTF-8"?>
<jnlp codebase="https://192.168.0.57:443" spec="1.0+">
    <information>
        <title>Virtual Console Client</title>
        <vendor>Dell Inc.</vendor>
        <icon href="https://192.168.0.57:443/images/logo.gif" kind="splash"/>
        <shortcut online="true"/>
    </information>
```

```
<application-desc main-class="com.avocent.idrac.kvm.Main">
    <argument>ip=192.168.0.57</argument>
    <argument>vm=1</argument>
    <argument>title=idrac%2C+PowerEdge+R630%2C+User%3A+root</argument>
    <argument>user=31@@574707914</argument>
    <argument>passwd=1675719543</argument>
    <argument>kmport=5900</argument>
    <argument>vport=5900</argument>
.
.
.
</application-desc>
<security>
    <all-permissions/>
</security>
<resources>
    <j2se version="1.6+"/>
    <jar href="https://192.168.0.57:443/software/avctKVM.jar" download="eager" main="true" />
</resources>
<resources os="Windows" arch="x86">
    <nativelib href="https://192.168.0.57:443/software/avctKVMIOWin32.jar" download="eager"/>
    <nativelib href="https://192.168.0.57:443/software/avctVMAPI_DLLWin32.jar" download="eager"/>
</resources>
.
.
.
<resources os="Linux" arch="x86_64">
    <nativelib href="https://192.168.0.57:443/software/avctKVMIOLinux64.jar" download="eager"/>
    <nativelib href="https://192.168.0.57:443/software/avctVMAPI_DLLLinux64.jar" download="eager"/>
    </resources>
</resources>
</jnlp>
```

With reference still to 410 of flow diagram 400 and to FIG. 5, in one embodiment, the request 513 for the host JNLP file 533 from the computing device 505 is received at the WebService 510 of the VCE 214 and the request is forwarded 514 from the WebService 510 to the host 525.

In another embodiment, the request 513 for the host JNLP file 533 from the computing device 202 is received at the WebService 510 of the VCE 214 which forwards the request 515 to a HMS 520. The HMS 520 then forwards 516 the request to the host 525. Thus, it is apparent that the request can pass through one or more different components within the VCE 214 before being received at the host 525.

In one embodiment, the request for the host JNLP file is received at a baseboard management controller (BMC) on the host 525.

For example, a BMC on a host is connected to a management switch over a 1G connection. This connection is used for Out-Of-Band (OOB) management. Both ToR switches are further connected to a pair of spine switches in a dual-LAG configuration using 40 G links. The spine switches are an aggregation layer for connecting multiple racks.

The management switch provides OOB connectivity through the BMC. In one embodiment, the management network fabric does not carry vSphere management, Virtual SAN, or vMotion traffic. That traffic resides on the network fabric created by the TOR and spine switches. As a result, in one embodiment the management switch is a non-redundant component in the physical rack.

In one embodiment, BMC provides a gateway for accessing hardware control functions, and allows the interface to be accessed from a remote system using serial or LAN connections. The BMC is powered-on even when the host itself is powered-off. If properly enabled, the BMC can respond to remote power-on commands.

Referring now to 415 of flow diagram 400 and to FIG. 5, one embodiment, in response to receiving the request for the host JNLP file 533 at the host 525, host 525 provides the host JNLP file 533 to the WebService 510 in the VCE 214 over 517. For purposes of the discussion, the host port may be a video port 5900.

In another embodiment, as shown in FIG. 5, responsive to receiving the request for the host JNLP file 533 at the host 525, the host 525 provides the host JNLP file 533 to the HMS 520 in the VCE 214, the HMS 520 will modify the host JNLP file 533 and then provide the host manager modified host JNLP file 543 from the HMS 520 to the WebService 510 in the VCE 214 via tunnel 519.

With reference to 420 of flow diagram 400, one embodiment modifies, at the WebService 510, the host JNLP file 533. For example, in one embodiment, the WebService 510 will parse the host JNLP file 533. The WebService 510 will further open a tunnel 517 listening on an available port of the WebService 510 ready to forward data to the host 525. The WebService 510 will then modify the host JNLP file 533 to include a codebase of an IP address that points to the newly created tunnel 517 established between the WebService 510 and the host 525. This would be a single link creation.

However, the technology is well suited for having a number of links in the chain of communication. For example, in the case of the HMS 520 acting as a communication link between the WebService 510 and the host 525 as described above. In that situation, the HMS 520 will receive the host JNLP file 533 and modify the host JNLP file 533 prior to the host JNLP file reaching the WebService 510.

For example, the HMS 520 will parse the host JNLP file 533. The HMS 520 will further open a tunnel 518 listening on an available port of the HMS 520 ready to forward data to the host 525. The HMS 520 will then modify the host JNLP file 533 to include a codebase of an IP address that points to the newly created tunnel 518 established between the HMS 520 and the host 525.

For purposes of the discussion, one example of the host manager parsing the JNLP file and opens a tunnel listening on an available port (e.g., 6000), ready to forward data to host_IP:5900. Host manager then edits the JNLP file with HostManager_IP:6000 before sending on the now modified JNLP file.

The HMS 520 will then provide the host manager modified host JNLP file 543 from the HMS 520 to the WebService 510 in the VCE 214. The WebService 510 will then modify the host manager modified host JNLP file 543. For example, the WebService 510 will parse the host manager modified host JNLP file 543. The WebService 510 will further open a tunnel 519 listening on an available port of the WebService 510 ready to forward data to the HMS 520. The WebService 510 will then modify the host manager modified host JNLP file 543 to include a codebase of an IP address that points to the newly created open tunnel 519 established between the WebService 510 and the HMS 520.

For purposes of the discussion, one example of the WebService parsing the JNLP file and opens a tunnel listening on an available port (e.g., 7000), ready to forward data to HostManager_IP:6000. WebService then edits the JNLP file with WebService_IP:7000 before sending on the now modified JNLP file.

It should be appreciated that although a single link and a plurality of links are described, the linking procedure could be expanded in a similar fashion such that it can be performed over numerous communication links. The use of only two examples herein is provided for purposes of clarity.

Referring now to 425 of flow diagram 400 and to FIG. 5, one embodiment provides, from the WebService 510, the WebService modified host JNLP file 553 to the computing device 202 outside of the VCE 214.

With reference to 430 of flow diagram 400 and to FIG. 5, one embodiment, responsive to receiving the WebService modified host JNLP file 553 at the computing device 202 outside of the VCE 214 via connection 526, utilizes information in the WebService modified host JNLP file 553 to establish a connection to the host 525 on the component in the VCE 214, and provide remote management of the component through the connection and via UI 300 of the computing device 202.

Thus, by opening the tunnels along the path which maintain connectivity to ports opened on the Host (e.g., BMC or the like) and by modify the JNLP file which the users open such that it connects to the nearest tunnel accessible, the remote console on computing device 202 is enabled.

In one embodiment, a timeout is implemented on the WebService modified host JNLP file 553, such that the tunnel connections (517-519) remain available for only a predetermined time period. For example, the connections may lapse after a 30 second time period. After the time period has lapsed, the remote computing device 202 would have to provide another request for the host JNLP in order to re-acquire the out-of-network control. Although 30 seconds is stated as a time period, it should be appreciated that the time period may be user definable, user adjustable, preset, or the like. Further, the time period can be based on the normal amount of time necessary to perform the control aspect that is being requested. However, the time period should remain within a reasonable time frame for security purposes. For example, if the time needed to perform the management of the host device would be approximately 5 minutes, then it would be reasonable to set a time period that included a 5-10% increase. E.g., the connection would expire after 5 minutes and 30 seconds.

In another example, assume MachineA on Network A talks to MachineB on Network B which talks to the Host BMC.

Initially, Machine A is configured with TCP Tunnel App, Source port: 5000, and Destination: MachineB IP:6000.

MachineB is configured with TCP Tunnel App, Source port: 6000, and Destination: HostBMC IP:5900.

Host BMC has a 'Remote Console video feed enabled on port 5900'

After the tunnels have been setup correctly, the host BMC JNLP file cannot be used as is because when it is downloaded from Host BMC, it has no notion of the tunnels and the new ports that has been opened at MachineA and MachineB.

Consider the WebService is running on MachineA, and user requests a remote console through the web service, the JNLP file downloaded from Host BMC at MachineB must be scanned to check which ports are being exposed by the host BMC console to send video information or jars required. The tunnels on MachineB should be created such that it can talk to these ports scanned from the JNLP file. Moreover, the tunnels on MachineA should be created such that it can talk to Tunnel App on MachineB.

Thus, the JNLP file now must be edited such that it points to the nearest accessible tunnel, in this case, the tunnel created on MachineA. For example,
Sample Extract of Original JNLP Content
<argument>ip=192.168.0.57</argument>
<argument>kmport=5900</argument>
<argument>vport=5900</argument>
Sample Extract of Edited JNLP Content after Tunnels are Setup
<argument>ip={MachineA_P}</argument>
<argument>kmport=5000</argument>
<argument>vport=5000</argument>

There are a few more changes required in the JNLP file such as the codebase IP which should now point to MachineA's IP address, and different tunnels specifically created to forward data to port 443 on Host BMC.
<jnlp codebase="https://192.168.0.57:443" spec="1.0+">

When the JNLP file is opened, a request for the relevant jars required (mentioned in the JNLP file) will go to the nearest tunnel opened. This tunnel will be responsible to forward the request to the next tunnel, and so on, till it reaches the BMC console. The jars will travel back to computing device 202 via the same tunnel. Once the java web start application starts, the video feed/keyboard inputs will travel via tunnels (different from the ones created for moving jars) similarly.

In one embodiment, an authentication is provided in the WebService modified host JNLP file 553 for validating the connection between the computing device 202 and the host 525, at the host 525.

That is, the JNLP file will have a way to authenticate the connection, in the present example, the JNLP content has an argument
<argument>user=31@ @574707914</argument>
Since this remains the same, the BMC console still thinks that the incoming requests (to video port 5900 in the present example) are valid.

Sample Code to Create Tunnels

```java
TCPTunnel.java
package com.vmware.vrack.hms.common.tcptunnel;
import java.io.IOException;
import java.net.ServerSocket;
import java.net.Socket;
import java.net.SocketException;
import java.net.SocketTimeoutException;
import org.slf4j.Logger;
import org.slf4j.LoggerFactory;
import com.vmware.vrack.hms.common.boardvendorservice.remoteconsole.kvm.jnlpconsole.JnlpPortType;
import com.vmware.vrack.hms.common.boardvendorservice.remoteconsole.tcptunnel.management.JnlpTunnelManager;
import com.vmware.vrack.hms.common.boardvendorservice.remoteconsole.tcptunnel.management.TunnelThreadPool;
/**
 * This is the TCPTunnel thread. Responsible for starting a local service which listens on a local port. When
 * a connection is made to this service, it connects to the a service on the given host ,port and is concerned
 * with forwarding data from the remote host to the bounce host and vice versa
 *
 *
 */
public class TCPTunnel implements Runnable {
    private static Logger logger = LoggerFactory.getLogger(TCPTunnel.class);
    private Integer localPort;
    private String host;
    private Integer port;
    private ServerSocket listener;
    private final Running running = new Running( );
    private JnlpTunnelManager tunnelManager;
    private TunnelThreadPool threadPool;
    private JnlpPortType tunnelType;
    public TCPTunnel(String host, Integer port, JnlpTunnelManager manager, TunnelThreadPool threadPool,
            JnlpPortType tunnelType, Integer tunnelServiceWaitTimeInMilliSec) throws IOException {
        this.running.setRunning(false);
        this.host = host;
        this.port = port;
        listener = new ServerSocket(0);
        // localport where the service is listening
        this.localPort = listener.getLocalPort( );
        // by default, we make the service to wait for connections for 30 sec.
        // if a connection is not made till this time, the video tunnel will
        // close down, and will close all the secondary tunnels
        this.listener.setSoTimeout(tunnelServiceWaitTimeInMilliSec);
        this.tunnelManager = manager;
        this.tunnelType = tunnelType;
        this.threadPool = threadPool;
    }
    public void run( ) {
        try {
            this.running.setRunning(true);
            // System.out.println("TCP tunnel is starting on port "+localPort+" and will connect to "+host+"
            // at port "+port);
            logger.debug("TCP tunnel is starting on port " + localPort + " and will connect to "
                    + host + " at port "
                    + port);
            while (this.running.isRunning( )) {
                Socket listenerSocket;
                try {
                    listenerSocket = listener.accept( );
                } catch (SocketTimeoutException e) {
                    if (tunnelManager != null)
                        tunnelManager.tunnelConnectionTimeOutAlert(tunnelType);
                    continue;
                }
                threadPool.execute(new SocketTunnel(listenerSocket, host, port, threadPool, tunnelManager, tunnelType));
            }
        } catch (SocketException e) {
            logger.debug("TCPTunnel Listener asked to close down when blocked on listening at port " + localPort, e);
```

-continued

```
            } catch (Exception e) {
                logger.warn("Exception in TCP tunnel listening at local port" + localPort, e);
            }
        }
        public void setTunnelServiceTimeOut(int timeOut) {
            try {
            this.listener.setSoTimeout(timeOut);
            } catch (SocketException e) {
                logger.warn("Could not set Service timeout for the TCPtunnel listening at " + localPort, e);
            }
        }
        public void setRunning(Boolean run) {
            synchronized (this.running) {
               this.running.setRunning(run);
            }
        }
        public Boolean isRunning( ) {
            return this.running.isRunning( );
        }
        public Integer getLocalPort( ) {
            return localPort;
        }
        public void setLocalPort(Integer localPort) {
            this.localPort = localPort;
        }
        public void stopTunnel( ) {
            setRunning(false);
            try {
                listener.close( );
            } catch (IOException e) {
                logger.debug("Thread was blocked, listening on " + localPort, e);
            }
            logger.debug("Shutting down TCPTunnel of type " + tunnelType);
        }
}
```

Sample Code for Socket Tunnel with Stream Connector (Consumed by TCPTunnel)

```
package com.vmware.vrack.hms.common.tcptunnel;
import java.io.IOException;
import java.io.InputStream;
import java.io.OutputStream;
import java.net.Socket;
import java.net.SocketException;
import java.util.UUID;
import org.slf4j.Logger;
import org.slf4j.LoggerFactory;
import com.vmware.vrack.hms.common.boardvendorservice.remoteconsole.kvm.jnlpconsole.JnlpPortType;
import com.vmware.vrack.hms.common.boardvendorservice.remoteconsole.tcptunnel.management.JnlpTunnelManager;
import com.vmware.vrack.hms.common.boardvendorservice.remoteconsole.tcptunnel.management.TunnelThreadPool;
/**
 * Connects to service at (bounceHost,bouncePort) and starts stream connectors which connects remoteSocket's
 * inputStream to bounceSocket's outputStream and bounceSocket's inputStream to RemoteSocket's outputStream.
 *
 *
 */
public class SocketTunnel implements Runnable {
    private static Logger logger = LoggerFactory.getLogger(SocketTunnel.class);
    private UUID socketTunnelId;
    private Socket remoteSocket;
    private String bounceHost;
    private int bouncePort;
    private Object terminationHandler;
    private StreamConnector inConnect, outConnect;
    private TunnelThreadPool threadPool;
    private JnlpTunnelManager tunnelManager;
```

```
    public SocketTunnel(Socket remoteSocket, String bounceHost, int bouncePort,
TunnelThreadPool threadPool,
            JnlpTunnelManager tunnelManager, JnlpPortType tunnelType) {
        this.remoteSocket = remoteSocket;
        this.bounceHost = bounceHost;
        this.bouncePort = bouncePort;
        this.terminationHandler = new Object( );
        this.threadPool = threadPool;
        this.tunnelManager = tunnelManager;
        socketTunnelId = UUID.randomUUID( );
        if (tunnelManager != null)
            this.tunnelManager.newSocketTunnelCreated(socketTunnelId, tunnelType);
    }
    public void run( ) {
        logger.debug("Starting a socket tunnel for remote host " +
remoteSocket.getInetAddress( )
                + " and connecting to bounce host at " + bounceHost + " at port" +
bouncePort);
        try (Socket bounceSocket = new Socket(bounceHost, bouncePort);) {
            remoteSocket.setTcpNoDelay(true);
            bounceSocket.setTcpNoDelay(true);
            // start Stream connectors to deal with forwarding data
            inConnect = new StreamConnector(remoteSocket.getInputStream( ),
bounceSocket.getOutputStream( ),
                    terminationHandler);
            outConnect = new StreamConnector(bounceSocket.getInputStream( ),
remoteSocket.getOutputStream( ),
                    terminationHandler);
            threadPool.execute(inConnect);
            threadPool.execute(outConnect);
            // wait till streamConnector notifies
            synchronized (terminationHandler) {
                this.terminationHandler.wait( );
            }
            remoteSocket.close( );
            logger.debug("Terminating socket tunnel for SocketTunnelId " +
socketTunnelId);
        } catch (Exception e) {
        } finally {
            if (tunnelManager != null)
                tunnelManager.socketTunnelClosed(socketTunnelId);
        }
    }
    public void stopSocketTunnel( ) {
        if (inConnect != null)
            inConnect.terminateStreamConnector( );
        if (outConnect != null)
            outConnect.terminateStreamConnector( );
    }
    /**
     * Forwards all the content on the inputStream to the outputStream
     *
     * @author tpanse
     *
     */
    private static class StreamConnector implements Runnable {
        private InputStream inStream;
        private OutputStream outStream;
        private Object socketTunnelTerminationHandler;
        final static int bufferSize = 65536;
        private boolean serviceStatus;
        public StreamConnector(InputStream in, OutputStream out, Object
socketTunnelTerminationHandler) {
            this.inStream = in;
            this.outStream = out;
            this.socketTunnelTerminationHandler = socketTunnelTerminationHandler;
            this.serviceStatus = true;
        }
        public void terminateStreamConnector( ) {
            try {
                inStream.close( );
            } catch (IOException e) {
                logger.debug("exception caught which closing inputStream ", e);
            }
            try {
                outStream.close( );
            } catch (IOException e) {
                logger.debug("exception caught which closing outputStream ", e);
            }
```

```
        }
        public void run( ) {
            logger.debug("starting a stream connector");
            byte[ ] buffer = new byte[bufferSize];
            try {
                while (serviceStatus) {
                    int size = Math.max(1, Math.min(inStream.available( ),
buffer.length));
                    size = inStream.read(buffer, 0, size);
                    if (size != −1) {
                        try {
                            outStream.write(buffer, 0, size);
                            outStream.flush( );
                        } catch (SocketException se) {
                            logger.debug("bounce host has closed the socket. Closing
stream connector");
                            break;
                        }
                    } else {
                        logger.debug("End of file detected by stream connector");
                        break;
                    }
                }
            } catch (IOException e) {
                logger.debug("thread is blocked on IO operation and socket is
closed", e);
            } finally {
                serviceStatus = false;
                terminateSocketTunnel( );
                logger.debug("Exiting stream connector");
            }
        }
        /**
         * Responsible for releasing socketTunnel if it is waiting
         */
        public void terminateSocketTunnel( ) {
            synchronized (socketTunnelTerminationHandler) {
                socketTunnelTerminationHandler.notify( );
            }
        }
    }
}
```

The edited JNLP content, when utilized by the outside-of-network computer system, allows the nearest tunnel and nearest port to be available to the outside-of-network computer system at each link until the host is reached. At the same time, the JNLP file will maintain the appropriate user names and passwords for each link in the chain.

Utilizing a Remote Display Server on HMS

In one embodiment, JNLP files for different server models might differ in its format. They could differ in the number of arguments, argument data, etc. For example: in the above JNLP extract, the argument for servers ip might differ, it could be <argument>ip=192.168.0.57</argument>[e.g for some Dell servers]

or

<argument>192.168.0.57</argument>[e.g for some Quanta servers],

Since these arguments need to be parameterized so that they can be replaced with IP of the nearest tunnel opened, the code needs to be changed to support different formats of JNLP file for different server models. In other words, the addition of a new server model will require code changes to parse the JNLP file and parameterize it.

Further, opening a JNLP file launches a JAVA web start application. This requires JAVA to be installed on the computing device 202.

Moreover, at least two tunnels have to be opened along the way. One to download the required jars e.g., <jnlp codebase="https://192.168.0.57:443" spec="1.0+">[HTTP PORT] and at least another to enable the video data e.g., <argument>vport=5900</argument>

Thus, at least 2 tunnels will need to be opened on every machine along the way to the machine which can talk to the host. This makes tunnel management a somewhat more difficult task.

Operation Utilizing a Remote Display Server on HMS

FIG. 6 illustrates a flow diagram 600 of another method for providing outside-of-network management of a component in a virtual data center, according to various embodiments. Procedures of the method will be described with reference to elements and/or components of FIGS. 2 and 7. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, software, or a combination of hardware with firmware and/or software.

Figure 7:
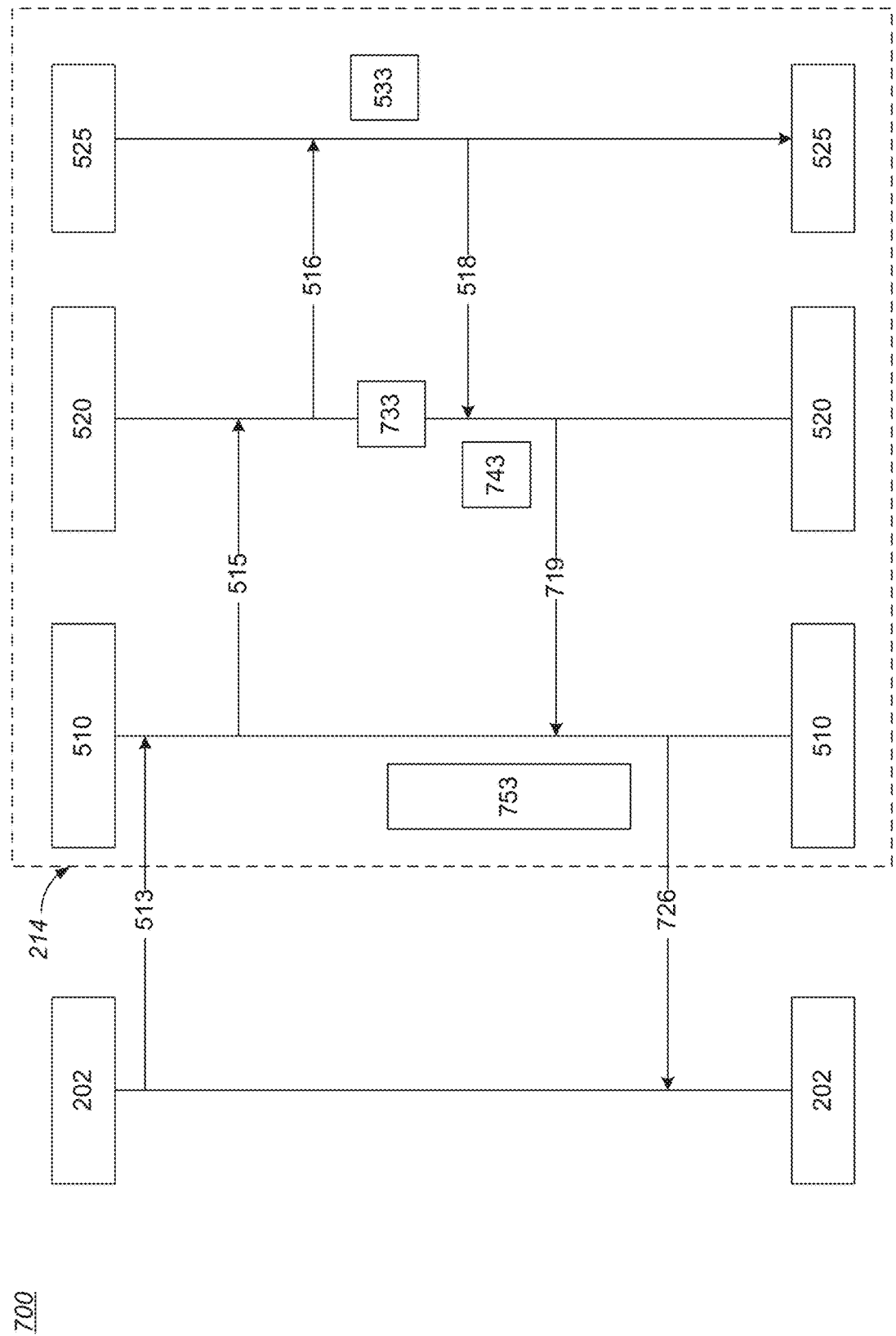
FIG. 7 illustrates a block diagram illustrating another outside-of-network management connection and in network connections for communication between the computer system and the component of the virtual data center, according to various embodiments.

With reference to FIG. 7, a block diagram 700 of the establishment of another outside-of-network management connection for communication between the computing device 202 and the component of the virtual data center is shown in accordance with an embodiment. In one embodiment, for purposes of the discussion, the computing device 202 which is outside of VCE 214 can reach the WebService 510 and the WebService 510 can reach the HMS 520, with HMS 520 being allowed to talk to Host 525. However, it should be appreciated that there may be other connections, including more or less connections, that may be placed between the computing device 202 and the host 525. The following discussion is just one version that can readily be expanded or contracted within the scope of the discussion.

With reference to 610 of flow diagram 600 and to FIG. 7, one embodiment provides, from a computing device 202 outside of a VCE 214, a request 513 for access to the host JNLP file 533 for a host 525 on the component in the VCE 214. An example of host JNLP file 533 is previously provided in the discussion of FIG. 4 and is not repeated for purposes of clarity.

With reference still to 610 of flow diagram 600 and to FIG. 5, in one embodiment, the request 513 for access to the host JNLP file 533 from the computing device 505 is received at the WebService 510 of the VCE 214 which forwards a request 515 to a HMS 520. The HMS 520 then forwards 516 the request to the host 525. Thus, it is apparent that the request can pass through one or more different components within the VCE 214 before being received at the host 525.

In one embodiment, the request for access to the host JNLP file is received at a baseboard management controller (BMC) on the host 525.

For example, a BMC on a host is connected to a management switch over a 1G connection. This connection is used for Out-Of-Band (OOB) management. Both ToR switches are further connected to a pair of spine switches in a dual-LAG configuration using 40 G links. The spine switches are an aggregation layer for connecting multiple racks.

The management switch provides OOB connectivity through the BMC. In one embodiment, the management network fabric does not carry vSphere management, Virtual SAN, or vMotion traffic. That traffic resides on the network fabric created by the TOR and spine switches. As a result, in one embodiment the management switch is a non-redundant component in the physical rack.

In one embodiment, BMC provides a gateway for accessing hardware control functions, and allows the interface to be accessed from a remote system using serial or LAN connections. The BMC is powered-on even when the host itself is powered-off. If properly enabled, the BMC can respond to remote power-on commands.

Referring now to 615 of flow diagram 600 and to FIG. 7, one embodiment, in response to receiving the request for access to the host JNLP file 533 at the host 525, provides the host JNLP file 533 to the HMS 520 in the VCE 214 via tunnel 518.

With reference now to 617, responsive to receiving host JNLP file 533, HMS 520 will initiate a remoted display server. For example, when HMS 520 receives host JNLP file 533, a remote display server, e.g., an application 733, will be opened on the HMS 520 and will utilized the host JNLP file 533. One example of application 733 is XPRA (https://www.xpra.org) as it has a built in HTML5 client to serve the application view as a web page. Although XPRA is disclosed herein, it should be appreciated that other applications 733 having the capability of providing the application 733 view as a web page could also be used.

In one embodiment, a single port will be enabled on the HMS 520 which will serve the web requests instead of enabling multiple ports (e.g HTTP_PORT to download the jars when JNLP is opened at the client end and a VIDEO_PORT to forward the video data) as described previously.

Referring now to 620, one embodiment provides, from HMS 520 and to a WebService 510, the port information 743 for accessing application 733 to WebService 510 in the VCE 214 via tunnel 719. That is, HMS 520 will open a tunnel 719 listening on an available port of the HMS 520 ready to receive data from WebService 510. In one embodiment, HMS 520 information 743 will include a codebase of an IP address that points to the newly created tunnel 719 established between WebService 510 and HMS 520.

For example, in one embodiment HMS 520 opens a tunnel 719 listening on an available port (e.g., 6000), ready to enable access to the application 733 which uses the JNLP file and enables display on the available port (e.g., 6000).

Referring now to 625, one embodiment provides, from WebService 510 and to computing device 202 outside of VCE 214, a WebService 510 port information 753, the WebService 510 port information 753 including HMS 520 port information 743. That is, WebService 510 will open a TCP tunnel 726 listening on an available port of the WebService 510 ready to receive data from computing device 202. In one embodiment, WebService 510 will include a codebase of an IP address that points to the newly created tunnel 719 established between computing device 202 and WebService 510. For example, in one embodiment WebService 510 opens TCP tunnel 726 listening for computing device 202 on an available port (e.g., 5000).

Moreover, WebService 510 port information 753 will also include the information to allow computing device 202 to access application 733 on HMS 520. For example, WebService 510 port information 753 would include a codebase of an IP address that points to the newly created TCP tunnel 726 established between computing device 202 and WebService 510 and further include a codebase of the IP address that points to the created tunnel 719 established between the WebService 510 and the HMS 520.

One example of WebService 510 port information 753 could be: start TCP tunnel on available port, E.g., 5000 to forward requests to/from HMS 520: 6000.

It should be appreciated that although a plurality of links are described, the linking procedure could be expanded or contracted in a similar fashion such that it can be performed over more or fewer communication links. The use of two links herein is provided merely for purposes of clarity.

With reference to 630 of flow diagram 600 and to FIG. 5, one embodiment, responsive to receiving the WebService 510 port information 753 at the computing device 202 outside of the VCE 214, utilizes the WebService 510 port information 753 to establish a connection from a browser operating on computing device 202 to application 733 on HMS 520.

Referring now to 635 of FIG. 6 and to FIG. 7, one embodiment utilizes the browser on computing device 202 and WebService 510 port information 753 to contact HMS 520 to provide remote management of the component via the remote display server (e.g., application 733) operating on HMS 520.

Thus, by opening the tunnels along the path which maintain connectivity to ports opened on the Host (e.g., BMC or the like) and by allowing the JNLP file to be opened by application 733 and presented in a web environment, the remote console on computing device 202 is enabled.

In one embodiment, a timeout is implemented on the WebService 510 port information 753, such that tunnels 719 and 726 remain available for only a predetermined time period. For example, the connections may lapse after a 30 second time period. After the time period has lapsed, the remote computing device 202 would have to provide another request for the host JNLP in order to re-acquire the out-of-network control. Although 30 seconds is stated as a time period, it should be appreciated that the time period may be user definable, user adjustable, preset, or the like. Further, the time period can be based on the normal amount of time necessary to perform the control aspect that is being requested. However, the time period should remain within a reasonable time frame for security purposes. For example, if the time needed to perform the management of the host device would be approximately 5 minutes, then it would be reasonable to set a time period that included a 5-10% increase. E.g., the connection would expire after 5 minutes and 30 seconds.

When the JNLP file is opened, a request for the relevant jars required (mentioned in the JNLP file) will only go to HMS 520. Once the application 733 starts, the video feed/keyboard inputs will travel via TCP tunnel 726 and tunnel 719 between application 733 on HMS 520 and computing device 202. As such, authentication is provided by HMS 520 for validating the connection between HMS 520 and host 525.

The additional tunnels and TCP tunnel do not need any validation with respect to the JNLP file (e.g., the relevant jars required) as they are not passing the JNLP file information. An example of the sample code to create tunnel(s) 719 and TCP tunnel 726 are previously provided in the discussion of FIG. 4 and not repeated for purposes of clarity.

Referring now to 635 of FIG. 6, one embodiment utilizes the browser on the computing device and the connection to the HMS 520 to provide remote management of the component via the remote display server operating on the HMS 520. For example, application 733 running on the HMS 520 acts as a remote display server and client for forwarding an application screen. As such, when host JNLP file 533 is downloaded on the HMS 520, the Java web start application 733 is launched on HMS 520 and its view is made available to computing device 202 on a web browser.

Thus, the same application can serve web requests which will provide the view of the host JNLP file 533 via application 733 opened on HMS 520. As described herein, if there are more hops between computing device 202 and the HMS 520, additional tunnels can be used to forward web requests from computing device 202 to the HMS 520.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

I claim:

1. A computer-implemented method for outside-of-network management of a component in a virtual data center using a remote display on a HostManagement server (HMS), the method comprising:

providing, from a computing device outside of a virtual data center network, a request for access to a host Java network launch protocol (JNLP) file for a baseboard management controller (BMC) on a host on the component in the virtual data center network, said virtual data center network further comprising:
a software-defined data center (SDDC) having a hyper-converged infrastructure (HCI) solution based on defined hardware configurations which are pre-integrated with SDDC software;

responsive to receiving the request for access to the host JNLP file at the BMC, providing the host JNLP file to the HMS in the virtual data center network;

responsive to receiving the host JNLP file at the HMS, opening the host JNLP file and initiating a remote display server on the HMS, wherein opening the host JNLP file initiates an application on the HMS configured to create an application view using video data received from the BMC and to send user input data to the BMC;

providing, from the HMS and to a WebService inside the virtual data center network, an HMS port information comprising information identifying an open port of the HMS for accessing the remote display server;

providing, from the WebService and to the computing device outside of the virtual data center network, a WebService port information, the WebService port information including the HMS port information;

responsive to receiving the WebService port information at the computing device outside of the virtual data center network, utilizing the WebService port information to establish a connection from a browser on the computing device outside of the virtual data center network to the HMS in the virtual data center network; and utilizing the browser to display the application view received from the remote display server via the connection to the HMS, and to provide user input data for remote management of the component via the remote display server operating on the HMS.

2. The computer-implemented method of claim 1, further comprising:
receiving the request for the host JNLP file for the host at the HMS of the virtual data center network; and
forwarding the request for the host JNLP file for the host from the HMS to the host.

3. The computer-implemented method of claim 1, further comprising:
receiving the request for the host JNLP file for the host at the WebService of the virtual data center network;
forwarding the request for the host JNLP file for the host from the WebService to the HMS on the virtual data center network; and
providing the request for the host JNLP file for the host from the HMS to the host.

4. The computer-implemented method of claim 1, wherein the remote display server is configured to serve the application view as a web page to the browser on the computing device, and wherein initiating the remote display server on the HMS further comprises:

enabling a single port on the HMS to receive requests from the browser on the computing device, wherein the single enabled port is the open port identified in the HMS port information.

5. The computer-implemented method of claim 1, wherein providing the WebService port information further comprises:
providing a first IP address that points to an open WebService port; and
providing a second IP address that points to the open HMS port.

6. The computer-implemented method of claim 1, further comprising:
providing an authentication in the WebService port information for validating, at the HMS, the connection between the computing device and the HMS.

7. The computer-implemented method of claim 1, further comprising:
implementing a timeout for the connection established using the WebService port information, such that the connection from the browser to the HMS remains available for only a predetermined time period.

8. A non-transitory computer readable storage medium having computer readable program code stored thereon for causing a computer system to perform a method for outside-of-network management of a component in a virtual data center network using a remote display on a HostManagement server (HMS), the method comprising:
providing, from a computing device outside of a virtual data center network, a request for access to a host Java network launch protocol (JNLP) file for a baseboard management controller (BMC) on a host on the component in the virtual data center network, said virtual data center network further comprising:
a software-defined data center (SDDC) having a hyper-converged infrastructure (HCI) solution based on defined hardware configurations which are pre-integrated with SDDC software;
responsive to receiving the request for access to the host JNLP file at the BMC, providing the host JNLP file to the HMS in the virtual data center network;
responsive to receiving the host JNLP file at the HMS, opening the host JNLP file and initiating a remote display server on the HMS, wherein opening the host JNLP file initiates an application on the HMS configured to create an application view using video data received from the BMC and to send user input data to the BMC;
providing, from the HMS and to a WebService inside the virtual data center network, an HMS port information comprising information identifying an open port of the HMS for accessing the remote display server;
providing, from the WebService and to the computing device outside of the virtual data center network, a WebService port information, the WebService port information including the HMS port information;
responsive to receiving the WebService port information at the computing device outside of the virtual data center network, utilizing the WebService port information to establish a connection from a browser on the computing device outside of the virtual data center network to the HMS in the virtual data center network; and
utilizing the browser to display the application view received from the remote display server via the connection to the HMS, and to provide user input data for remote management of the component via the remote display server operating on the HMS.

9. The non-transitory computer readable storage medium of claim 8, further comprising:
receiving the request for the host JNLP file for the host at the HMS of the virtual data center network; and
forwarding the request for the host JNLP file for the host from the HMS to the host.

10. The non-transitory computer readable storage medium of claim 8, wherein the BMC on the host is connected to a management switch.

11. The non-transitory computer readable storage medium of claim 8, wherein the remote display server is configured to serve the application view as a web page to the browser on the computing device, and wherein initiating the remote display server on the HMS further comprises:
enabling a single port on the HMS to receive requests from the browser on the computing device, wherein the single enabled port is the open port identified in the HMS port information.

12. The non-transitory computer readable storage medium of claim 8, further comprising:
providing an authentication in the WebService port information for validating, at the HMS, the connection between the computing device and the HMS; and
implementing a timeout for the connection established using the WebService port information, such that the connection from the browser to the HMS remains available for only a predetermined time period.

13. A method for outside-of-network management of a hardware component in a virtual data center, using a remote display on a HostManagement server (HMS), the method comprising:
providing, from a computing system outside of a virtual data center network, a request for access to a host Java network launch protocol (JNLP) file for a baseboard management controller (BMC) on a host on a component in the virtual data center network, the BMC being connected to a management switch and said virtual data center network further comprising:
a software-defined data center (SDDC) having a hyper-converged infrastructure (HCI) solution based on defined hardware configurations which are pre-integrated with SDDC software;
responsive to receiving the request for access to the host JNLP file at the BMC, providing the host JNLP file to the HMS in the virtual data center network;
responsive to receiving the host JNLP file at the HMS, opening the host JNLP file and initiating a remote display server on the HMS, wherein opening the host JNLP file initiates an application on the HMS configured to create an application view using video data received from the BMC and to send user input data to the BMC;
providing, from the HMS and to a WebService inside the virtual data center network, an HMS port information comprising information identifying an open port of the HMS for accessing the remote display server;
providing, from the WebService and to the computing system outside of the virtual data center network, a Web Service port information, the WebService port information including the HMS port information;
responsive to receiving the WebService port information at the computing system outside of the virtual data center network, utilizing the Web Service port information to establish a connection from a browser on the computing system outside of the virtual data center network to the HMS in the virtual data center network; and utilizing the browser to display the application view received from the remote display server via the connection to the HMS, and to provide user input data for remote management of the component via the remote display server operating on the HMS.

14. The method of claim 13, further comprising:

displaying, on the computing system, a selection of a plurality of hardware components in the virtual data center to manage;

displaying a selected hardware component to manage, a view of the selected hardware component displayed responsive to receiving a selection of the hardware component to manage from the plurality of hardware components displayed; and displaying manageable aspects of the selected hardware component on the display, the manageable aspects displayed responsive to utilizing the browser of the computing system via the connection to the HMS to provide remote management of the component via the remote display server operating on the HMS.

15. The method of claim 13, further comprising:

receiving the request for the host JNLP file for the host at the WebService of the virtual data center network;

forwarding the request for the host JNLP file for the host from the WebService to the HMS on the virtual data center network; and providing the request for the host JNLP file for the host from the HMS to the BMC on the host.

16. The method of claim 13, wherein the remote display server is configured to serve the application view as a web page to the browser on the computing device, and wherein initiating the remote display server on the HMS further comprises:

enabling a single port on the HMS to receive requests from the browser on the computing system, wherein the single enabled port is the open port identified in the HMS port information.

* * * * *